US011804151B2

(12) United States Patent
Clemens et al.

(10) Patent No.: US 11,804,151 B2
(45) Date of Patent: Oct. 31, 2023

(54) INFANT SLEEP POSITION DEMONSTRATION DEVICE

(71) Applicant: Parkview Health, Fort Wayne, IN (US)

(72) Inventors: Lisa Clemens, Auburn, IN (US); John Lozo, Churubusco, IN (US)

(73) Assignee: Parkview Health, Fort Wayne, IN (US)

( * ) Notice: Subject to any disclaimer, the term of this patent is extended or adjusted under 35 U.S.C. 154(b) by 327 days.

(21) Appl. No.: 17/334,291

(22) Filed: May 28, 2021

(65) Prior Publication Data
US 2022/0383778 A1 Dec. 1, 2022

(51) Int. Cl.
*G09B 23/30* (2006.01)
*G09B 23/34* (2006.01)

(52) U.S. Cl.
CPC ........... *G09B 23/303* (2013.01); *G09B 23/34* (2013.01)

(58) Field of Classification Search
CPC ........ G09B 23/28; G09B 23/30; G09B 23/32; A63H 3/001; A63H 3/24
See application file for complete search history.

(56) References Cited

U.S. PATENT DOCUMENTS

| | | | |
|---|---|---|---|
| 1,341,985 A | | 6/1920 | Kemp |
| 4,106,220 A | * | 8/1978 | Hurd ...................... G09B 19/02 434/194 |
| 4,522,403 A | * | 6/1985 | Maciorowski ........ A63F 9/0811 273/154 |
| 4,575,351 A | * | 3/1986 | Gonzalez ............... A63H 3/003 446/369 |
| 5,011,449 A | * | 4/1991 | Handy ..................... A63H 3/48 446/303 |
| 5,083,962 A | | 1/1992 | Pracas |
| 5,083,965 A | * | 1/1992 | Mayem .................... A63H 3/28 446/305 |
| 5,299,938 A | | 4/1994 | Waltho |
| 5,516,322 A | | 5/1996 | Myers |
| 6,050,826 A | * | 4/2000 | Christianson .......... A63H 3/001 434/262 |

(Continued)

FOREIGN PATENT DOCUMENTS

CN 201237847 Y 5/2009
CN 109036061 A 12/2018

*Primary Examiner* — Kurt Fernstrom
(74) *Attorney, Agent, or Firm* — Faegre Drinker Biddle and Reath LLP

(57) ABSTRACT

An interactive infant simulation device used to demonstrate the proper sleep position of an infant. The infant simulation device can include an infant body portion and a transparent upper respiratory passageway at least partially contained within the infant body portion. The infant body portion can include one or two parts, and the two parts can be removeably coupled to one another. The infant simulation device can be moved from a first position to a second position, and a colored fluid contained within the upper respiratory passageway can be viewed moving between passages representing the trachea, esophagus, and pharynx of an infant. In one case (e.g., a stomach-down orientation), the fluid may be present in the tracheal passage, demonstrating the improper sleep position of an infant. In another case (e.g., a back-down orientation), the tracheal passage may be substantially free from fluid, demonstrating the proper sleep position of an infant.

20 Claims, 3 Drawing Sheets

(56) References Cited

U.S. PATENT DOCUMENTS

| | | | |
|---|---|---|---|
| 6,604,980 B1 * | 8/2003 | Jurmain | A63H 3/24 |
| | | | 434/266 |
| 6,997,718 B1 * | 2/2006 | Boettcher | A63H 3/001 |
| | | | 434/270 |
| RE39,791 E * | 8/2007 | Jurmain | A63H 3/28 |
| | | | 434/238 |
| 8,672,684 B2 * | 3/2014 | Ray | G09B 23/28 |
| | | | 434/270 |
| D895,724 S | 9/2020 | Jolly | |
| 11,117,067 B2 * | 9/2021 | Comfort | A63H 18/00 |
| 11,141,675 B1 * | 10/2021 | Cirolia | A63H 33/042 |
| 2003/0198925 A1 * | 10/2003 | Dowell | G09B 23/28 |
| | | | 434/262 |
| 2019/0009180 A1 | 1/2019 | Lawson | |
| 2020/0273369 A1 | 8/2020 | Lawson | |

\* cited by examiner

INFANT SLEEP POSITION DEMONSTRATION DEVICE

BACKGROUND

1. Technical Field

The present disclosure relates to an interactive educational device used to demonstrate the proper handling of an infant, and in particular, used to illustrate both safe and unsafe sleeping positions of the infant.

2. Description of Related Art

Infants can suffer from airway infections, such as pneumonia, when regurgitated stomach fluid is inhaled through the infant's trachea and into the infant's lungs. Infants can also suffer from asphyxiation if they are unable to clear regurgitated fluids and/or solids from the trachea. A common way these issues occur is when the infant sleeps in an improper sleep position, and particularly, when the infant sleeps in a face down sleep position. Caregivers may be unaware of how to properly position an infant for sleep and allow infants to sleep on their stomachs.

What is needed is a demonstrative device that can be used to educate caregivers as to the proper sleep position of an infant.

SUMMARY

In one embodiment, the present disclosure provides an infant simulation device used to demonstrate the proper sleep position of an infant. In this case, the infant simulation device can include an infant body portion and a transparent upper respiratory passageway where the upper respiratory passageway can be at least partially positioned within the infant body portion. The upper respiratory passageway can include an esophageal passage in fluid communication with a tracheal passage. A colored fluid can also be contained within the upper respiratory passageway, where the colored fluid flows between the esophageal passage and the tracheal passage responsive to a position of the upper respiratory passageway.

In another embodiment, the infant simulation device can include an infant body portion that includes a first part and a second part. In this case, the first part can be removably coupled to the second part by at least one pair of couplings. The infant simulation device can also include a transparent upper respiratory passageway that can be partially positioned within the first part of the infant body portion. The upper respiratory passageway can include an esophageal passage in fluid communication with a tracheal passage. A colored fluid can also be contained within the upper respiratory passageway where the colored fluid flows between the esophageal passage and the tracheal passage responsive to a position of the upper respiratory passageway.

In a further embodiment, a method for demonstrating the sleep position of an infant is presented. The method may include moving an infant simulation device between a first position and a second position. The movement of the infant simulation device may cause a colored fluid to flow between an esophageal passage and a tracheal passage of a transparent upper respiratory passageway. The upper respiratory passageway can be at least partially positioned within an infant body portion of the infant simulation device. The method may also include determining, when the infant simulation device is in the second position, whether the infant simulation device is in either a proper sleep position or an improper sleep position based upon the colored fluid being present in either the esophageal passage or the tracheal passage. In this case, the proper sleep positioned is determined when the tracheal passage is substantially free from the colored fluid, and the improper sleep position is determined when the tracheal passage contains a portion of the colored fluid.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
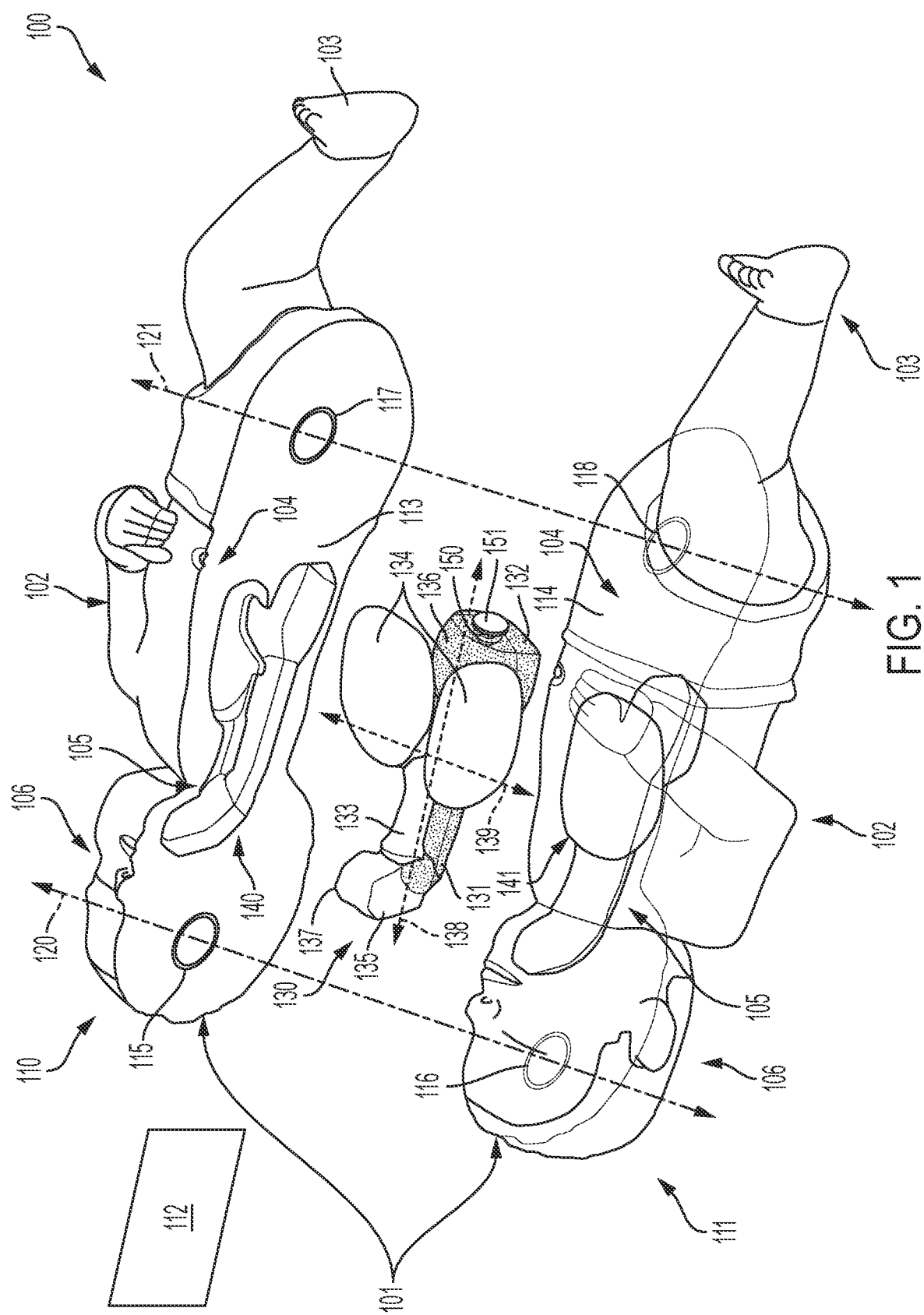
FIG. 1 is a perspective, exploded view of an embodiment of an infant simulation device in accordance with the present disclosure.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

Infants (e.g., babies under 1 year of age) commonly regurgitate (e.g., spit up, vomit, etc.) fluids that are contained in the infant's stomach into the infants pharynx. This phenomenon has many causes, some attributed to the infant's immature gastrointestinal system. For instance, an infant may spit-up fluid after consuming too much milk and/or formula while feeding. In other cases, infants may suffer from gastroesophageal reflux (GERD), which is a common condition where fluid from the infant's stomach leaks into the esophageal passage due to an immature esophageal sphincter. In each of these cases, stomach fluids may accumulate in the infant's esophagus and/or pharynx.

When the infant is in an upright position, gravity aids in the infants ability to swallow such fluid down the esophagus and into the stomach. However, when the infant is in a prone position (i.e., lying down) gravitational assistance is lessened, making it more difficult for the infant to swallow the fluids into the stomach. In this case, the stomach fluids may be accidentally inhaled by the infant, travel down the trachea, and eventually pool in the bronchial passages of the infant's lungs. Any solids that might be present in the regurgitation may also be inhaled, or block the trachea of the infant, which can lead to asphyxiation.

An infant's immune systems are immature, which leaves them more susceptible to infection. In the case where fluids pool in the infant's lungs, upper respiratory infections can easily develop, which can lead to serious airway compromises such as Bronchitis and Pneumonia. Furthermore, infants can suffer from Sudden Infant Death Syndrome (SIDS), and although the cause of such syndrome is unknown, a recognized theory is that SIDS occurs when infants are unable to clear spit up fluids and/or solids from the airway, leading to asphyxiation and sudden death.

One way to lessen the risk of upper respiratory infections and/or SIDS is to have the infant sleep in a back-down orientation (e.g., on the infant's back). In this position, the infant's esophagus is oriented lower than the trachea in relationship to the ground, and as such, the esophagus acts as the low point of the upper respiratory system. In this case, gravity, in combination with the autonomic reflex to swallow, allows for any fluids and/or accumulated solids that might have been regurgitated, refluxed, or otherwise enter the infant's mouth during the night, to drain into the infant's stomach and keep the infant's airway free. This substantially lowers the risk of serious airway compromises by minimizing the amount of fluid that might enter the infant's lungs. This also lessens the risk of SIDS in that any solids that may be regurgitated would not block the airway, and rather, could be coughed up or swallowed back down the esophagus with the assistance of gravity and swallowing.

However, when an infant sleeps face-down (e.g., on the infants stomach), the trachea is oriented lower than the esophagus in relationship to the ground, and as such, the trachea acts as the low point of the upper respiratory system. In this case, gravity drains the fluid, or any possible accumulated solids, into the esophagus. When the infant breathes in, the fluid and/or solids are then inhaled into the lungs. This substantially increases the risk of infection by exposing the infant's lungs to bacteria that may be present in the fluids/solids, and in some cases, may even lead to asphyxiation if the esophagus becomes blocked by the fluids/solids.

Infants, and particularly infants under 6 months of age, often times are physically incapable of rolling from stomach to back due to the immature muscle development in the upper body and neck. In this case, if an infant is placed in a stomach down position to sleep, or if the infant rolls onto its stomach while sleeping, it may be incapable of rolling onto its back. This can lead to the fluids and/or solids accumulating in the trachea, substantially heightening the risk of infection and/or asphyxiation.

Proper education of these principles is required in order to avoid otherwise preventable illness and death in infants. The American Academy of Pediatrics has released revised safe-sleep guidelines, which include recommending that infants be "placed in a supine position . . . until the child reaches 1 year of age." American Academy of Pediatrics, Updated 2016 *Recommendations for a Safe Infant Sleeping Environment*, PEDIATRICS volume 138; no. 5, November 2016. However, there may remain a misconception, for example, held by some senior caregivers, based upon an outdated medical consensus that stomach sleeping is not only safe, but in fact, the preferred orientation to place an infant when sleeping. Caregivers, and particularly, first time parents, may be unaware and or/miseducated in that it is unsafe to allow an infant to sleep on their stomach until they are capable of rolling from stomach to back. As the anatomy of the infants upper respiratory system is complex, many caregivers lack the combined knowledge of both bodily fluid mechanics in relation to this complex physiology to understand why stomach-sleeping is unsafe. As such, even if a caregiver is told not to allow an infant to sleep on their stomach generally, they may ignore such instructions.

What is provided is an interactive infant simulation device that can be used to demonstrate both the anatomical and fluid mechanical principles of an infant's upper respiratory system, in order to educate caregivers as to proper and improper sleep positions for the infant. The educational impact of this infant simulation device is heightened over other traditional educational methods (e.g., literature, models, etc.) in that the device is lifelike, simulates an infant in both size and feel, and the anatomical principles are presented, and interacted with, in a highly approachable and memorable way.

Figure 2:
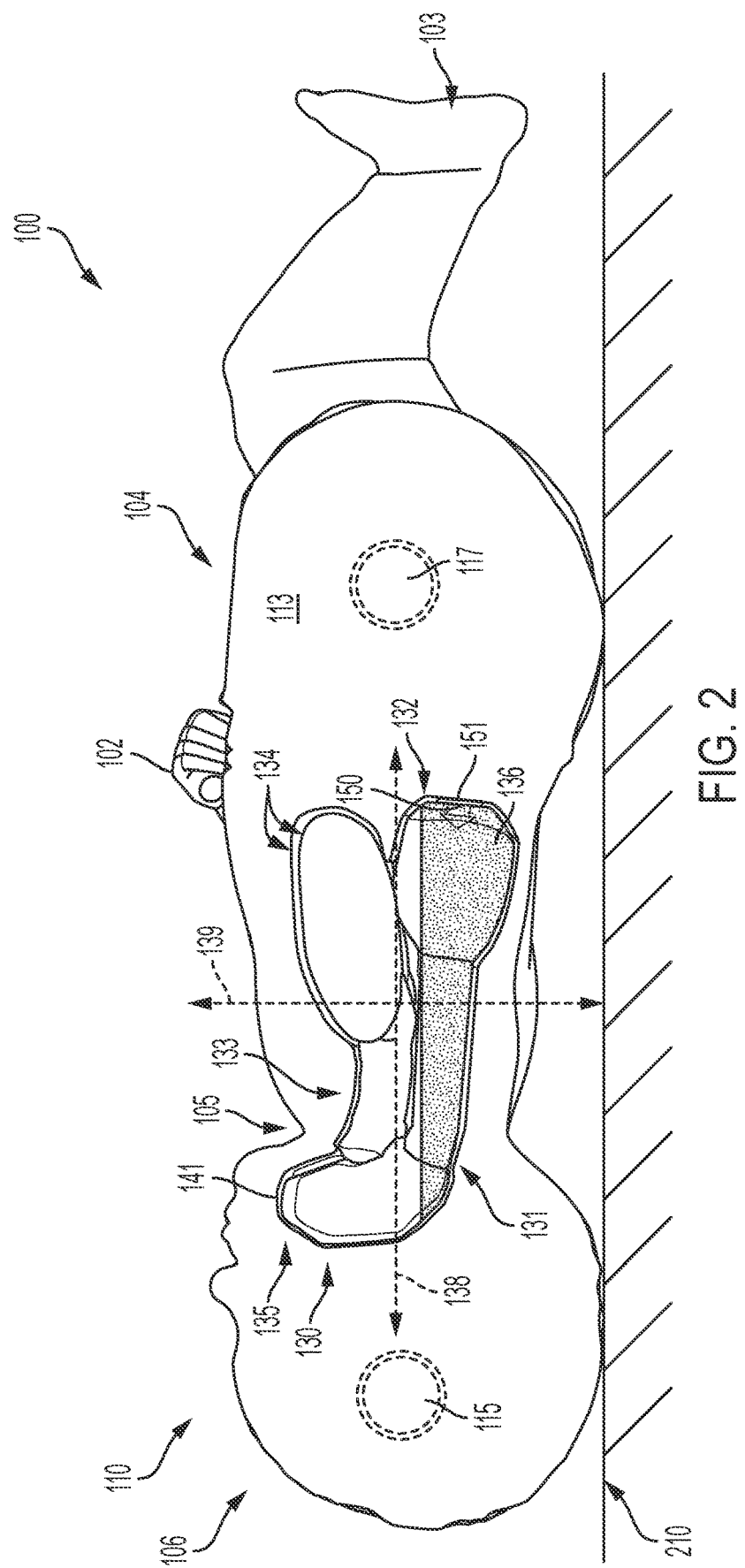
FIG. 2 is a side view of the infant simulation device of FIG. 1 in a back-down orientation.
Figure 3:
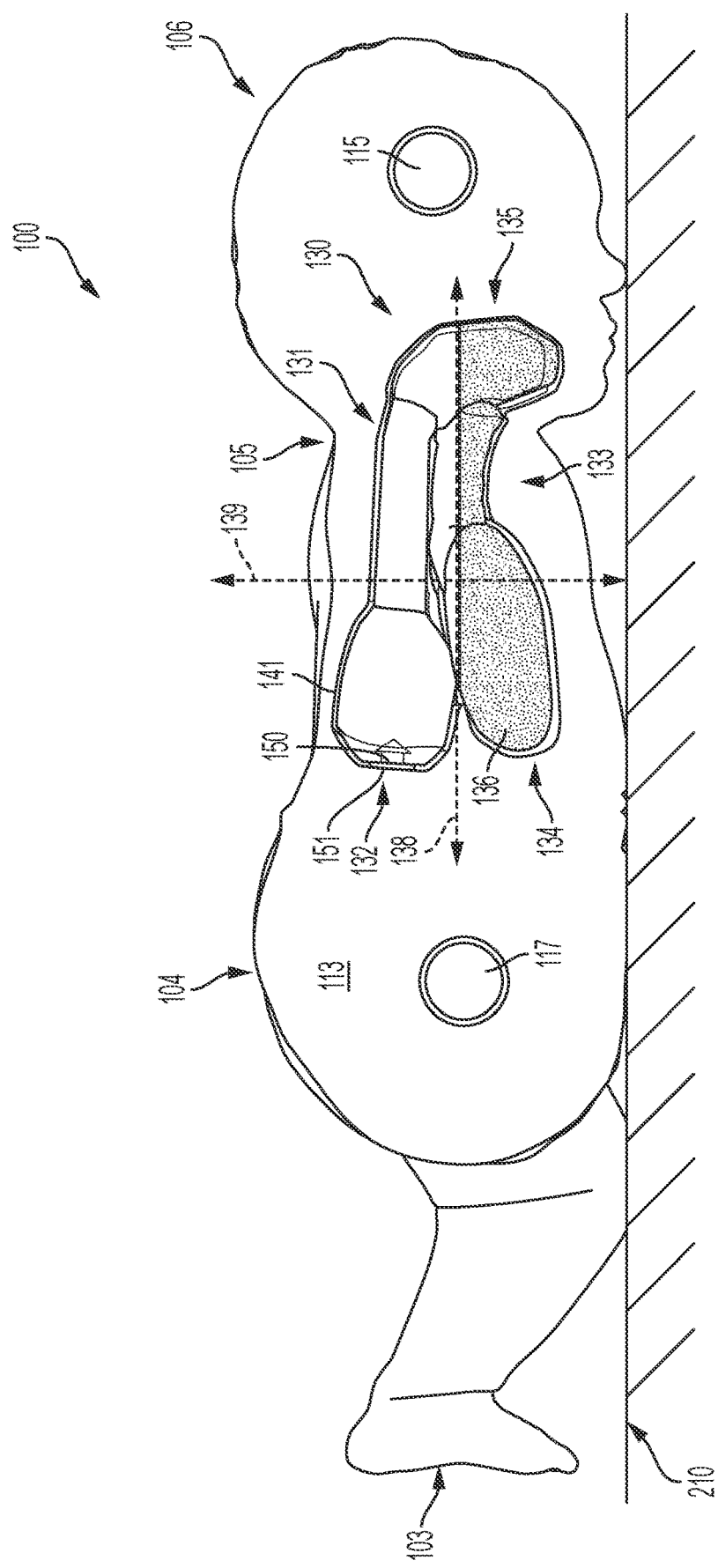
FIG. 3 is a side view of the infant simulation device of FIG. 1 in a stomach-down orientation.

An example of such an infant simulation device is illustrated in FIGS. 1-3. FIGS. 1-3 illustrate an infant simulation device 100 in accordance with the present disclosure. As illustrated in FIG. 1, Infant simulation device 100 includes infant body 101 and upper respiratory passageway 130. Infant body 101 may include lifelike anatomical representations of an infant, such as arms 102, legs 103, torso 104, neck 105, and head 106, and/or any other features that may be present on a typical infant. These features may add to the lifelike appearance and feel of infant simulation device 100, so that an instructor and/or caregiver can interact with infant simulation device 100 in a lifelike way.

Infant body 101 can be formed by a variety of different methods, either alone, or in combination, including casting, printing (e.g., 3D printing), molding, carving, and/or any other suitable forming method to create infant body 101. Infant body 101 may be made of a variety of materials including polymers, such as soft rubbers, gels, wood, and/or metals, where such materials can be selected to achieve a desired effect such as a lifelike feel and response to movement, rigidity, durability, color, or any other suitable material characteristic. For example, specific materials such as platinum-catalyzed silicones and/or platinum cure liquid silicone compounds can be selected such that the shore hardness of the compounds enables a lifelike feel and movement when a caregiver interacts with infant simulation device 100. Infants may lack the muscle definition to properly support the head and neck, and the specific material and shore hardness of such materials can be selected to give infant body 101 a lifelike response to movement. For example, the shore hardness of the selected materials may fall on the shore 00 or shore A scales, and more particularly, around shore 10 A hardness. Additionally, specific parts of infant body 101 (e.g., head 106, neck 105, arms 102, etc.), may be selected from different materials, or from the same material within a different shore hardness range, such that the different parts of infant body 101 simulates a lifelike response to the movement of a typical infant. The lifelike feel of infant body 101 may enable a caregiver to interact with infant simulation device 100 in a more meaningful way, contributing to the educational effect of infant simulation device 100.

Although FIGS. 1-3 illustrate infant body 101 including all of the anatomical representations 102-106, in some cases, infant body 101 may only include a portion of an infant body. For example, infant body 101 may lack arms 102, legs 103, and/or head 106. In any of these cases, the inclusion, or lack of inclusion, of any part of infant body 101 may be based upon teaching efficacy, where the inclusion or lack of inclusion of such features enhances the ability for infant simulation device 100 to demonstrate important educational concepts (e.g., anatomy, fluid mechanics, etc.) while taking other secondary factors into consideration (e.g., transportability, cost of manufacturing and retail price, durability of the device, etc.). For example, infant body 101 may be a portion of infant body 101 including torso 104, and neck 105, and lack all other body part features. Alternatively, infant body 101 may include torso 104, neck 105, and head 106, but lack either one, or both of, arms 102 and/or legs 103. In any of these cases, selection of the inclusion of specific parts of infant body 101 may be based on a variety of factors, including reducing the size of infant simulation device 100 (e.g., for aesthetics, durability, and/or cost of manufacturing of infant simulation device 100).

As illustrated in FIG. 1, infant body 101 includes first half 110 and second half 111. First half 110 and second half 111 may be symmetrical halves of infant body 101, such that when infant body 101 is divided down a longitudinal plane 112 (e.g., a longitudinal midline of infant body 101), each of first half 110 and second half 111 form complimentary counterparts, symmetric about longitudinal plane 112, and are mirror images of one another.

The two halves 110 and 111 are divided about longitudinal plane 112, and a first flat surface 113 and a second flat surface 114 are formed extending about longitudinal plane 112. In this case, when first half 110 is combined with second half 111, flat surfaces 113 and 114 align, and infant body 101 forms a full three-dimensional representation of an infant. Flat surfaces 113 and 114 may be smooth flat surfaces, or, in some cases, may be textured such that when first half 110 is combined with second half 111, friction is used to assist in keeping the first half 110 and second half 111 aligned. In other examples, flat surfaces 113 and 114 may only be substantially flat, and protrusions may extend evenly, or unevenly, either orthogonal to, or at any angle from, each of surfaces 113 and/or 114. Such protrusions may be used when coupling first half 110 to second half 111, such as used for alignment, or could be used for other applicable purposes.

Although illustrated as symmetrical halves in FIG. 1, first half 110 and second half 111 may be asymmetrical distributions of infant body 101, where either first half 110 and/or second half 111 are unevenly proportioned (e.g., not divided about the midline/longitudinal plane 112). In this case, first half 110 and second half 111 may be referred to as parts of infant body 101, rather than halves. Additionally, and as illustrated in FIGS. 2 and 3, infant body 101 may only include one of first half 110 and/or second half 111. In such cases, only one half may be used in infant simulation device 100, rather than both of the two halves 110 and 111.

First half 110 and second half 111 may be coupled to one another such that when first half 110 and second half 111 are combined, a three-dimensional representation of an infant is formed (e.g., infant simulation device 100 forms a full three-dimensional infant). In this case, the coupling may be by a variety of methods including clips, snaps, bolts, hitches, hook and loop fasteners, magnets, or any other suitable coupling method. For example, infant body 101 may include two pairs of magnets, the first pair including first magnet 115 and second magnet 116, and the second pair including third magnet 117 and fourth magnet 118. Each of the magnets 115-118 may be at least partially, if not fully, embedded within either first half 110 and/or second half 111. For example, first magnet 115 and third magnet 117 may be partially, or fully, embedded within first half 110 and second magnet 116 and fourth magnet 118 may be partially, or fully, embedded in second half 111. Such embedding may occur either at the time of forming infant body 101 (e.g., embedding during a molding step), or after the time of formation in a separate manufacturing step (e.g., machining out a portion of either first half 110 and/or second half 111 and inserting the magnets). For example, in the case where infant body 101 is formed in either a single formation step (e.g., a combined mold and subsequently divided) or in separate formations steps (e.g., first half 110 formed in a separate mold from second half 111), the magnets 115-118 may be placed into the un-solidified material prior to cooling the mold. Alternatively, after cooling the molded halves, the flat surface of the infant body half may be machined (e.g., milled) out into a recess to accept the magnet and either the recess filled with additional material, or, in the case of partial embedding, affixed to the machined portion (e.g., recess) and partially exposed from the flat surface. Additional adhesive compounds (e.g., epoxy, glue, rubber, etc.) may also be used to secure magnets 116-118 to infant body 101. In any of these cases, each of the magnets 116-118 are permanently fixed to infant body 101.

Each of the magnets 115-118 may align such that when first half 110 is combined with second half 111, infant body 101 combines in a way that the perimeter of infant body 101 is contiguous and infant body 101 forms a fully encapsulated three dimensional representation of an infant. For example, first magnet 115 may be located in the proximate portion of first half 110 (e.g., in/near the head 106 or the upper portion of torso 104 of first half 110), second magnet 116 may be located in the proximate portion of second half 111 (e.g., in/near the head 106 or the upper portion of torso 104 of second half 111), third magnet 117 may be located in the distal portion of first half 110 (e.g., in/near the lower portion of torso 104 of first half 110), and forth magnet 118 may be located in the distal portion of second half 111 (e.g., in/near the lower portion of torso 104 of second half 111). Each of the magnet pairs (e.g., first pair: first magnet 115 and second 116, as well as second pair: third magnet 117 and fourth magnet 118) may align in polarity, and when first flat surface 113 and second flat surface 114 approach contacting one another, the distal portion and the proximate portion of infant body 101 may snap into alignment via magnetic attraction of the two pairs of magnets. For example, when first half 110 approaches second half 111, first magnet 115 and second magnet 116 may align about first transverse axis 120, and once first magnet 115 and second magnet 116 come within close proximity, first magnet 115 and second magnet 116 magnetically attract and hold the proximate portion of infant body 101 together at first transverse axis 120. Similarly, when first half 110 approaches second half 111, third magnet 117 and fourth magnet 118 may align about second transverse axis 121, and once third magnet 117 and fourth magnet 118 come within close proximity, third magnet 117 and fourth magnet 118 magnetically attract and hold the distal portion of infant body 101 together at second transverse axis 121. In these cases, the two magnetic pairs hold the two halves of infant body 101 such that the outer perimeter of first half 110 and second half 111 substantially align.

Although discussed as magnets 115-118, in some embodiments, the magnets could be replaced with, or combined with, any other form of couplings/fasteners (e.g., such as hook and loop fasteners, snaps, etc.). In such cases, and as with magnets 115-118, such couplings could be embedded within, or attached to, first flat surface 113 and/or second flat surface 114. Additionally, although illustrated and discussed as relating to two pairs of magnets including the four magnets 115-118, more or less magnets/couplings may be used. For example, many pairs of magnets/couplings may be located throughout the infant body 101, and aligned such that when first half 110 approaches second half 111, the halves are secured together by the many couplings. For example, many small magnets could be embedded around the perimeter of the head 106, neck 105, and torso 104 of both first half 110 and second half 111, or any other portion of infant body 101, and could be used to couple the two halves 110 and 111 together. Alternatively, less magnets than illustrated may be used (e.g., one large magnet located in both the torso 104 portions of both first half 110 and second half 111) and/or combined with any other fastening method, including friction as described previously relating to flat surfaces 113 and 114.

Infant simulation device 100 includes upper respiratory passageway 130. Upper respiratory passageway 130 may be based upon an anatomical representation of the upper respiratory system of an infant. As described previously, when an infant lies in a back down orientation, any fluid that may be regurgitated, or otherwise enter the infant's mouth, is assisted by gravity as well as the swallowing reflex, and flows down the esophagus and into the stomach. However, when an infant sleeps in a stomach-down orientation, gravity causes for the fluid to accumulate at the inlet to the infants airway (e.g., trachea), and when the infant inhales, some fluid may drain into the infants lungs. This can contribute to upper respiratory infections, including airway compromise pneumonia, by exposing the infant's lungs to bacteria in the inhaled fluid. Furthermore, if the infant is unable to clear the fluid and/or solids from the inlet to the trachea, the infant may asphyxiate. Upper respiratory passageway 130 is a demonstrative device, meant to illustrate these concepts in a simplified way.

Upper respiratory passageway 130 is a hollow structure (e.g., a hollow cavity) enclosed (e.g., encapsulated, encompassed, etc.) by a transparent outer layer 137. Transparent outer layer 137 forms a water-tight structure, where upper respiratory passageway 130 includes multiple anatomical passages such as esophagus 131, stomach 132, trachea 133, lungs 134, and pharynx 135. Each of the passages 131-135 are hydraulically coupled within upper respiratory passageway 130 where a fluid 136 can flow between each of esophagus 131, stomach 132, trachea 133, lungs 134, and pharynx 135. For example, lungs 134 are hydraulically connected (e.g., fluidly coupled) to trachea 133, and trachea 133 is hydraulically connected to pharynx 135. In this example, fluid 136 can flow both into and out of trachea 133, lungs 134, and pharynx 135. Additionally, stomach 132 is hydraulically connected to esophagus 131, and esophagus 131 is hydraulically connected to pharynx 135. In this example, fluid 136 can flow both into and out of esophagus 131, stomach 132, and pharynx 135. In each of these cases, pharynx 135 acts as the connecting passageway for fluid 136 between both esophagus 131 and trachea 133, and can accumulate fluid 136 as it passes to and from both of esophagus 131 and trachea 133. Although described relating to a transparent hollow passageway, in some cases, upper respiratory passageway 130 may only be substantially hollow (e.g., with solid portions and/or baffles within the cavity) and/or the transparent outer layer 137 may only be semi-rigid and/or semitransparent (e.g., translucent).

The flow of fluid 136 between each of the passages simulates the effect of an infant's sleep position (e.g., the orientation of upper respiratory passageway 130) on the flow and corresponding accumulation of fluid 136 within upper respiratory passageway 130. Upper respiratory passageway 130 is designed to simplify the anatomy of the upper respiratory system of an infant to enable a basic, yet accurate model for which the proper sleep position of an infant is demonstrated through fluid mechanics in combination with anatomical concepts. For example, and as best illustrated in FIG. 2, in a back-down orientation, an infant's esophagus is located more closely to the ground than the trachea. As illustrated in FIG. 2, upper respiratory passageway 130 is oriented such that esophagus 131 is closer in proximity to bottom surface 210, and therefore, positioned lower with respect to gravity than trachea 133. In this case, any accumulated fluid 136 within either trachea 133 and/or lungs 134 flows (e.g., drains) through pharynx 135 into esophagus 131 and stomach 132 via gravity's assistance. This visualization demonstrates how the back-down orientation of upper respiratory passageway 130 is a safe position for the infant to sleep to avoid fluid 136 from accumulating in trachea 133 or lungs 134, and therefore, is the proper sleep position for an infant.

As a second example, and as illustrated in FIG. 3, in a stomach-down orientation, the infant's trachea is located more closely to the ground than the esophagus. As illustrated in FIG. 3, upper respiratory passageway 130 can also be oriented such that trachea 133 is closer in proximity to bottom surface 210, and therefore, lower with respect to gravity than esophagus 131. In this case, any accumulated fluid 136 within either esophagus 131 and/or stomach 132 flows through pharynx 135 and into trachea 133 and lungs 134. This visualization demonstrates how the stomach-down orientation of upper respiratory passageway 130 is an unsafe and improper position for the infant because fluid 136 accumulates within trachea 133 and/or lungs 134.

Upper respiratory passageway 130 can be rotated about a longitudinal axis 138 and/or a transverse axis 139, such that upper respiratory passageway 130 can be positioned in any number of configurations. Changing the position of upper respiratory passageway 130 can be used to show how fluid 136 flows to and from each of the passages, such that a dynamic visualization of the fluid flow is possible. For example, upper respiratory passageway 130 can be rotated about longitudinal axis 138, where trachea 133 is rotated from a position disposed above esophagus 131 (e.g., as best illustrated in FIG. 2) to a position disposed below esophagus 131 (e.g., as illustrated in FIG. 3). This movement of upper respiratory passageway 130 dynamically illustrates the flow of fluid 136 when the infant simulation device 100 is moved from a back-down orientation to a stomach-down orientation, demonstrating how fluid 136 drains into trachea 133 and lungs 134 in this orientation. As a second example, upper respiratory passageway 130 can be rotated about longitudinal axis 138, where trachea 133 is rotated from a position disposed below esophagus 131 (e.g., as illustrated in FIG. 3), to a position disposed above esophagus 131 (e.g., as best illustrated in FIG. 2). This movement demonstrates the flow of fluid 136 when the infant is moved from a stomach-down to a back-down orientation. In this case, fluid 136 drains from lungs 134 and/or trachea 133 into pharynx 135, and then into esophagus 131 and stomach 132 as upper respiratory passageway 130 is rotated axially about longitudinal axis 138. This movement dynamically shows the flow of fluid 136 when the infant is moved from a stomach-down to a back-down orientation, demonstrating how fluid 136 drains into stomach 132 in this orientation. Although the foregoing is described in relation to axial movement about longitudinal axis 138, rotation of upper respiratory passageway 130 about transverse axis 139 can be used in combination with movement about longitudinal axis 138 to demonstrate any orientation that a user (e.g., instructor, caregiver, etc.) may desire to illustrate the flow of fluid 136 about the passages within upper respiratory passageway 130.

The shape and orientation of esophagus 131, stomach 132, trachea 133, lungs 134, and/or pharynx 135 may be enlarged and/or exaggerated passageways that represent the basic anatomical principles of and infant's upper respiratory system. In this case, rather than being molded and/or 3-D printed castings of an infant's anatomical trachea, lungs, esophagus, stomach, and/or pharynx, each of the passageways can be enlarged as compared to typical infant anatomy, and the transparent outer layer 136 more smooth (e.g., lacking physiological indentations/texturing) as compared to the textured surface present in nature. These deviations from nature are meant to allow for fluid 136 to move about upper respiratory passageway 130 more easily, and accumulate within each of the passages with less resistance than would be enabled if upper respiratory passageway 130 was an accurate anatomical representation. Furthermore, the overall size of upper respiratory passageway 130 may be enlarged in proportion to an anatomically correct infant. In nature, the esophagus, stomach, trachea, lungs, and pharynx of an infant are small features within the infant's body, and it would be difficult to observe the anatomical principles in a clear way if esophagus 131, stomach 132, trachea 133, lungs 134, and/or pharynx 135 were proportionately accurate to nature. In order to facilitate proper demonstration of the educational concepts of infant simulation device 100, either one of, or all of, the passageways may be enlarged in comparison to nature, and in some cases, grossly enlarged, allowing for proper observation of the flow of fluid 136 about the passages. Furthermore, although each of the passages may be located near anatomically representative locations within infant body 101, each of the passages may not be located at the exact anatomical location observed in nature. For example, pharynx 135 may be positioned lower than, and deeper within, in relation to infant body 101 than an anatomically correct infant. Such deviations may be based upon the need to compensate for the enlargement of the various passageways, the ability to visualize upper respiratory passageway 130 within infant body 101, and/or upon secondary design considerations (e.g., ease in manufacturing, durability, etc.) of infant simulation device 100.

Upper respiratory passageway 130 may be formed by a variety of different methods and out of many different materials such that upper respiratory passageway 130 can be used to demonstrate the fluid mechanical and physiological principles as described previously. For example, upper respiratory passageway 130 can be formed by 3-D printing, form casting, injection molding, or any suitable formation method so that transparent outer layer 136 is formed into a hollow, water-tight structure encompassing each of the passages. Fluid 136 can be added to the hollow interior portion of the structure either during formation (e.g., during a 2-part formation process), or after formation (e.g., injected into the structure and the opening sealed) so that upper respiratory passageway 130 contains fluid 136. Alternatively, fluid 136 can be added to, and drained from, the hollow interior portion of upper respiratory passageway 130 via drain 150. Drain 150 allows for a user to add fluid 136 to the hollow passages of upper respiratory passageway 130. In this case, the user can add fluid to a desirable level, such as one that best illustrates the flow of fluid 136 about the passageways. Additionally, fluid 136 can be drained from drain 150 in the event that a user desires to use a different fluid 136 within upper respiratory passageway 130. Drain 150 may be a protrusion (e.g., hole) located in transparent outer layer 137 at a distal portion of upper respiratory passageway 130 (e.g., a protrusion located at the bottom face of the distal portion of stomach 132). However, in some cases, drain 150 may be located on another portion of upper respiratory passageway 130 (e.g., on lungs 132, pharynx 135, etc.). Drain 150 may be plugged by plug 151. Plug 151 may be a removable plug that can be attached to, and detached from, drain 150 such that when drain 150 is plugged by plug 151, upper respiratory passageway 130 forms a water-tight structure (e.g., transparent outer layer 147 and plug 151 form a water-tight seal). Although described as a plug, plug 151 could also be a cap, a bung, a stopper, or any other suitable structure used prevent fluid 136 from escaping from drain 150 when plug 151 is inserted into drain 150.

Upper respiratory passageway 130 can be made out of many different materials, including polymers, such as resins, gels, thermoplastics, epoxides, and/or natural or synthetic rubbers, where the material is selected to achieve a desired effect such as skin strength, flexibility, transparency, translucency, durability, and/or any other suitable material characteristic. For example, a flexible polymer resin material can be 3-D printed into the hollow shape of the transparent outer layer 137 of upper respiratory passageway 130, where the shore hardness of the compound is selected to achieve a desired skin strength, yet maintain flexibility. In this case, the shore hardness of the selected materials may fall on the shore 00 and/or shore A scales, and more particularly, around shore 80 A hardness. The selected materials may be similar to the flexibility of a rubber or thermoplastic polyurethane (TPU) material, yet achieve a stiff, but soft-touch dexterous feel. The materials may also be selected for ease in manufacturing (e.g., printing or molding) of complex three dimensional shapes. The thickness of transparent outer layer 137 may be selected so that fluid 136 is visible through transparent outer layer 137, but maintains a desired strength. For example the thickness of transparent outer layer 137 may be in the range of 1 mm to 2 mm, and more particularly, in the range of 1.25 to 1.75 mm. Although discussed as being formed of only one material, specific passages of upper respiratory passageway 130, may be selected from different materials or from the same material within a different shore hardness range, such that the transparent outer layer 137 maintains a water-tight hollow structure while accounting for secondary characteristics (e.g., feel, skin strength, elasticity, etc.).

Fluid 136 can be selected from a variety of different fluids, where various characteristics of the fluid are selected to best demonstrate how fluid flows about the passages of upper respiratory passageway 130. For example, fluid 136 may be selected such that it is easily viewable when flowing through the passages of upper respiratory passageway 130. In this case, a colored fluid 136 can be selected, such as one that contains a pigment or is inherently colored. The coloration of fluid 136 can assist in the visualization of the path that fluid 136 takes when flowing about upper respiratory passageway 130. Additionally, fluid 136 may be selected based upon its ability to flow (e.g., viscosity) where the viscosity is selected so that fluid 136 easily flows about the passages of upper respiratory passageway 130 (e.g., does not substantially adhere to the inner surface of transparent outer layer 137). The viscosity of fluid 136 may also be selected based upon the ability to visualize the fluid flow, in that a fluid with a viscosity higher than water may be selected in order to reduce the speed that fluid 136 flows from passage to passage so that an observer can see the fluid flow more easily. However, in some cases, a viscosity close to water may be used, and/or water may be used.

Infant body 101 may include one or more recesses, such as first recess 140 and second recess 141. First recess 140 and second recess 141 may be recesses (e.g., depressions, pockets, voids, etc.) formed in first flat surface 113 and/or second flat surface 114. Each of the recesses 140 and 141 are sized to receive a portion of upper respiratory passageway 130. In some cases, recesses 140 and 141 may be complimentary counterparts, symmetric about longitudinal plane 112 (e.g. mirror images of one another). In this case, each recess 140 and 141 receives an equal proportion of upper respiratory passageway 130. However, in other cases, such as when upper respiratory passageway 130 is not a symmetrical shape and/or if one of the halves 110 and/or 111 are larger than the other, unequal proportions of upper respiratory passageway 130 may be received by each of the recesses 140 and 141. In these cases, recesses 140 and 141 may be asymmetric, where either recess 140 and/or 141 accepts different asymmetrical and/or larger/smaller proportions of, features of upper respiratory passageway 130.

Either, or both of, first recess 140 and/or second recess 141 may include some features to retain a portion of upper respiratory passageway 130 within each of the recesses. For example, first recess 140 may include rough (e.g., textured) portions of material within the inside surface of recess 140, such that when a portion of upper respiratory passageway 130 is inserted into first recess 140, friction assists in holding upper respiratory passageway 130 inside of recess 140. In this case, second recess 141 may include smooth surfaces, and when the remaining portion of upper respiratory passageway 130 is inserted into second recess 141 (i.e., when first half 110 is coupled to second half 111), second recess 141 does not secure the portion of upper respiratory passageway 130 to the same extent as first recess 140 (e.g., due to the lack of textured friction). In this case, when the two halves 110 and 111 are decoupled from one another, the portion of upper respiratory passageway 130 remains within first recess 140, rather than within second recess 141. This allows for the second half 111 to be separated and upper respiratory passageway 130 observed within first half 110. Although described relating to rough surfaces present in first recess 140, the inverse is also possible, in that second recess 141 may contain rough portions on the interior surface of second recess 141, and when the two halves 110 and 111 are decoupled, upper respiratory passageway 130 remains in second half 111. Alternatively, the inside surfaces of both first recess 140 and second recess 141 may not be textured in comparison to one another, and upper respiratory passageway 130 may be retained in either first recess 140 or second recess 141 when the two halves 110 and 111 are decoupled.

As described previously, upper respiratory passageway 130 may not be a symmetrical shape and therefore, either first recess 140 or second recess 141 may accept larger proportions of upper respiratory passageway 130. In this case, upper respiratory passageway 130 may remain in the recess containing the larger proportion of upper respiratory passageway 130. This recess may include rough surfaces, as described previously, or alternatively, may include substantially smooth surfaces. In either case, upper respiratory passageway 130 remains within the recess due to the disproportionate amount of contact of transparent outer layer 137 with the inner surface within the recess. Although described as relating to frictional forces retaining upper respiratory passageway 130 within either of recesses 140 and/or 141, couplings may additionally, or alternatively be used. For example upper respiratory passageway 130 may include coupling attached to the outer surface of transparent outer layer 137, or, in some cases, may include magnetic couplings either embedded within transparent outer layer 137 or enclosed within upper respiratory passageway 130. In any of these cases, the recess may include corresponding couplings (e.g., a matching polarity magnet, a loop of a hook and loop fastener, a female coupling, etc.) that may enable upper respiratory passageway 130 to be removably coupled to, and therefore, remain within, either recess 140 or 141 when the two halves 110 and 111 are decoupled.

Although described as removable, in some cases, upper respiratory passageway 130 may be permanently affixed (e.g., permanently coupled) to either first half 110 or second half 111. In this case, when the two halves 110 and 111 are decoupled, or in the case where infant body 101 includes only one half 110 or 111, a user can interact with the half retaining upper respiratory passageway 130 without the risk of the upper respiratory passageway 130 becoming decoupled from infant body 101. For example, during the formation of infant body 101, a portion of upper respiratory passageway 130 may be embedded within either flat surface 113 or 114, and, therefore, permanently coupled to either first half 110 or second half 111. Alternatively, a portion of transparent outer layer 137 may be adhered to the inner surface of either first recess 140 or 141 (e.g., via adhesive, glue, epoxy, rubber, etc.) and therefore, the portion of upper respiratory passageway 130 permanently coupled to either recess 140 or 141.

In most cases, upper respiratory passageway 130 is a fully removable feature of infant simulation device 100, where upper respiratory passageway 130 can be manipulated (e.g., moved about longitudinal axis 138 and/or transverse axis 139) independently from either of halves 110 or 111 of infant body 101. In this case, during a demonstrative exercise, a user may remove upper respiratory passageway 130 from either first recess 140 or second recess 141 and interact with it without interacting with infant body 101. As such, although the foregoing is described as relating to two halves 110 and/or 111, demonstration of anatomical and fluid mechanical principles can be accomplished either with upper respiratory passageway 130, or upper respiratory passageway 130 in conjunction with one of the halves 110 or 111. Therefore, although both halves 110 and 111 may be illustrated and the foregoing description described relating to two halves 110 and 111, it is understood that either, or both, halves 110 and/or 111 may not be used in some embodiments of infant simulation device 100. Therefore in any foregoing case, infant simulation device could include upper respiratory passageway 130 and first half 110, upper respiratory passageway 130 and second half 111, or upper respiratory passageway 130, first half 110, and second half 111.

As described previously, infant body 101 can include both first half 110 and second half 111, and the two halves 110 and 111 can be combined to form a 3-dimensional infant model that can be interacted with by a caregiver (e.g., moved into a stomach-down and/or back-down orientation). In this case, the two recesses 140 and 141 completely envelop (e.g., encompass, encase, etc.) upper respiratory passageway 130 within infant body 101, and when the two halves 110 and 111 are decoupled (e.g., by separating magnets 115-118), a portion of transparent outer layer 137 of upper respiratory passageway 130 is exposed, revealing the location of fluid 136. This interaction enables the user (instructor, caregiver, etc.) to determine which positions of the infant can cause fluid to accumulate in the trachea 133, and therefore, which positions are unsafe for the infant to sleep in. This lifelike interaction (e.g., handling of the entire infant simulation device 100), and observation of the position of fluid 136 in relation to the position of infant simulation device 100 enables the user to properly understand how bodily fluid mechanics (e.g., the flow of fluid 136 through the passages of upper respiratory passageway 130) interplays with physiology in a real-life context, therefore, increasing the educational benefit of infant simulation device 100.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An infant simulation device used to demonstrate a proper sleep position of an infant, the infant simulation device comprising:
an infant body portion; and
a transparent upper respiratory passageway at least partially positioned within the infant body portion, the upper respiratory passageway including an esophageal passage in fluid communication with a tracheal passage, and a colored fluid contained within the upper respiratory passageway, the colored fluid flowable between the esophageal passage and the tracheal passage responsive to a position of the upper respiratory passageway.

2. The infant simulation device of claim 1, wherein the upper respiratory passageway comprises a removable upper respiratory passageway, separable from the infant body portion, and is received within a recess in the infant body portion.

3. The infant simulation device of claim 1, wherein the upper respiratory passageway further comprises a pharyngeal passage, the pharyngeal passage fluidly connecting the esophageal passage to the tracheal passage.

4. The infant simulation device of claim 1, wherein, when the upper respiratory passageway is positioned in a first position, the esophageal passage contains a portion of the colored fluid and demonstrates an improper sleep position of the infant.

5. The infant simulation device of claim 4, wherein, when in the first position, an anterior section of the infant body portion is arranged substantially parallel to the ground.

6. The infant simulation device of claim 1, wherein, when the upper respiratory passageway is positioned in a second position, the esophageal passage is substantially free from the colored fluid and demonstrates the proper sleep position of the infant.

7. The infant simulation device of claim 6, wherein, when in the second position, a posterior section of the infant body portion is arranged substantially parallel to the ground.

8. The infant simulation device of claim 1, wherein the infant body portion is formed of a flexible polymeric material, the flexible polymeric material selected to replicate a substantially lifelike response to the movement of at least one part of the infant body portion.

9. The infant simulation device of claim 8, wherein the flexible polymeric material comprises a silicon rubberized material.

10. The infant simulation device of claim 1, wherein the upper respiratory passageway comprises a polymeric material formed by printing or casting.

11. An infant simulation device used to demonstrate a proper sleep position of an infant, the infant simulation device comprising:
an infant body portion comprising a first part and a second part, the first part removably coupled to the second part by at least one pair of couplings; and
a transparent upper respiratory passageway at least partially positioned within the first part, the upper respiratory passageway including an esophageal passage in fluid communication with a tracheal passage, and a colored fluid contained within the upper respiratory passageway, the colored fluid flowable between the esophageal passage and the tracheal passage responsive to a position of the upper respiratory passageway.

12. The infant simulation device of claim 11, wherein the first part and the second part comprise complimentary halves of the infant body portion symmetric about a longitudinal plane of the infant body portion.

13. The infant simulation device of claim 11, wherein the first part comprises a first recess configured to receive a first portion of the upper respiratory passageway and the second part comprises a second recess configured to receive a second portion of the upper respiratory passageway.

14. The infant simulation device of claim 13, wherein the upper respiratory passageway comprises a removable upper respiratory passageway, and either, or both of, the first recess and the second recess are configured to receive the removable upper respiratory passageway.

15. The infant simulation device of claim 13, wherein the first recess and the second recess are complimentary counterparts symmetric about a longitudinal plane of the infant body portion, and when the first part is coupled with the second part, the first recess and the second recess completely encompass the upper respiratory passageway.

16. The infant simulation device of claim 11, wherein the at least one pair of couplings comprises a first pair of magnetic couplings including a first magnet and a second magnet, the first magnet at least partially embedded within the first part, the second magnet at least partially embedded within the second part, and wherein the first magnet and the second magnet substantially align about a first transverse axis about the infant body portion when the first part is coupled to the second part.

17. The infant simulation device of claim 16, wherein the first transverse axis is positioned within a proximate section of the infant body portion.

18. The infant simulation device of claim 16, wherein the at least one pair of couplings further comprises a second pair of magnetic couplings including a third magnet and a fourth magnet, the third magnet at least partially embedded within the first part, the fourth magnet at least partially embedded within the second part, and wherein the third magnet and the fourth magnet substantially align about a second transverse axis about the infant body portion when the first part is coupled to the second part.

19. The infant simulation device of claim 18, wherein the second transverse axis is positioned within a distal section of the infant body portion.

20. A method for demonstrating a sleep position of an infant, the method comprising:
moving an infant simulation device between a first position and a second position, the movement causing a colored fluid to flow between an esophageal passage and a tracheal passage of a transparent upper respiratory passageway, the upper respiratory passageway at least partially positioned within an infant body portion of the infant simulation device; and
determining, when the infant simulation device is in the second position, whether the infant simulation device is in either a proper sleep position or an improper sleep position based upon the colored fluid being present in either the esophageal passage or the tracheal passage, the proper sleep positioned determined when the tracheal passage is substantially free from the colored fluid, and the improper sleep position determined when the tracheal passage contains a portion of the colored fluid.

* * * * *